(12) United States Patent  
Korus

(10) Patent No.: US 10,139,034 B2  
(45) Date of Patent: Nov. 27, 2018

(54) IRRIGATION PIPE LINER

(71) Applicant: LINDSAY CORPORATION, Omaha, NE (US)

(72) Inventor: Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 249 days.

(21) Appl. No.: 15/257,477

(22) Filed: Sep. 6, 2016

(65) Prior Publication Data

US 2018/0066788 A1 Mar. 8, 2018

(51) Int. Cl.

| | |
|---|---|
| *F16L 23/12* | (2006.01) |
| *F16L 58/10* | (2006.01) |
| *F16L 58/18* | (2006.01) |
| *F16L 11/12* | (2006.01) |
| *F16L 55/165* | (2006.01) |
| *A01G 25/09* | (2006.01) |

(52) U.S. Cl.  
CPC ........ *F16L 58/1018* (2013.01); *A01G 25/092* (2013.01); *F16L 11/122* (2013.01); *F16L 55/1652* (2013.01); *F16L 58/187* (2013.01); *F16L 55/1656* (2013.01)

(58) Field of Classification Search  
CPC .............................. F16L 23/125; F16L 41/08  
USPC ........... 285/55, 200, 260; 138/147; 156/202, 156/294  
See application file for complete search history.

(56) References Cited

U.S. PATENT DOCUMENTS

| | | | | |
|---|---|---|---|---|
| 1,143,351 A | * | 9/1915 | Benson ................. | E02B 11/005 137/236.1 |
| 1,949,984 A | * | 3/1934 | Walker ................ | F16L 58/1009 110/184 |
| 2,088,922 A | * | 8/1937 | Porteous ................. | F16L 58/10 138/140 |
| 2,145,451 A | * | 1/1939 | McCoy ................. | B05B 15/658 239/547 |
| 2,595,408 A | * | 5/1952 | Quest ...................... | F16L 31/00 138/128 |
| 2,721,764 A | * | 10/1955 | Wilson, Jr. ............. | B05B 1/267 239/276 |
| 3,254,651 A | * | 6/1966 | Collito ................... | A61B 17/11 285/260 |
| 3,695,104 A | * | 10/1972 | Mannherz ............... | G01F 1/588 138/140 |
| 4,000,620 A | * | 1/1977 | Burge ..................... | E02B 13/00 251/145 |

(Continued)

OTHER PUBLICATIONS

Through-tile-weave hose from Goodyear; http://www.goodyearrubberproducts.com/top-100-products/Goodyear-Spiraflex-PVC-hose/Goodyear-Spirallex-PVC-hose.asp.

*Primary Examiner* — David Bochna  
(74) *Attorney, Agent, or Firm* — Hovey Williams LLP

(57) ABSTRACT

A pipe liner for lining a fluid-carrying pipe, the pipe liner comprising an elongated flexible conduit and a flexible flange. The flexible conduit includes an outer wall forming an open-ended central channel for allowing fluids to be pumped therethrough. The flexible flange extends radially from one end of the elongated conduit and includes a number of fastener holes. The flexible conduit and the flexible flange are configured to be collapsed and pulled through the pipe such that the flexible flange can be connected to a rigid flange of the pipe via the fastener holes. The pipe liner is less prone to leak and is easier to transport and install.

16 Claims, 8 Drawing Sheets

(56) References Cited

U.S. PATENT DOCUMENTS

| | | | |
|---|---|---|---|
| 5,242,517 A * | 9/1993 | Endoh | B29C 66/1142 |
| | | | 156/156 |
| 5,934,332 A | 8/1999 | Rodriguez et al. | |
| 6,109,535 A | 8/2000 | Korus | |
| 6,619,565 B1 * | 9/2003 | Abbott | A01G 25/02 |
| | | | 239/273 |
| 8,672,240 B2 * | 3/2014 | Masarwa | F16L 41/14 |
| | | | 138/124 |

* cited by examiner

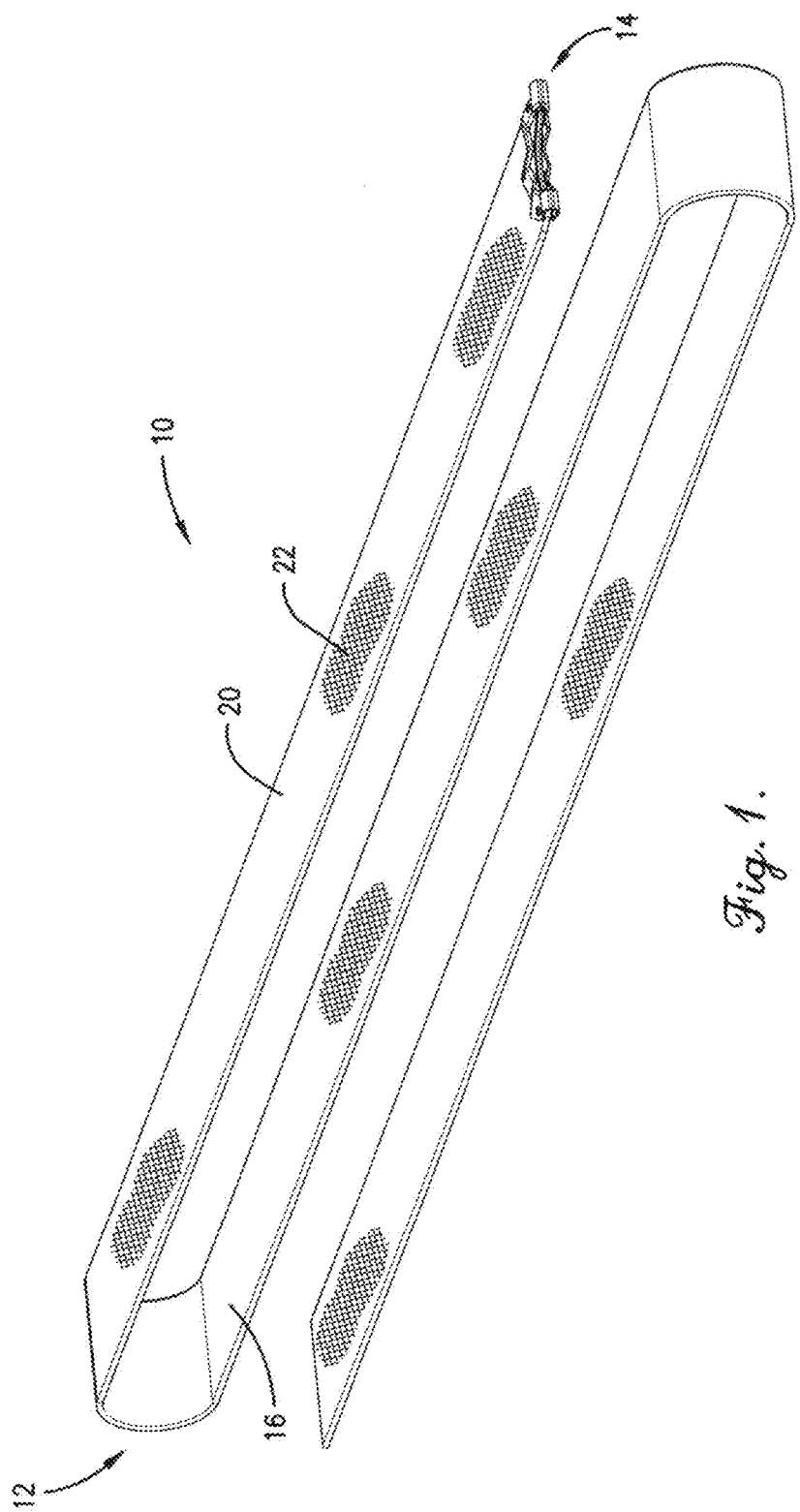

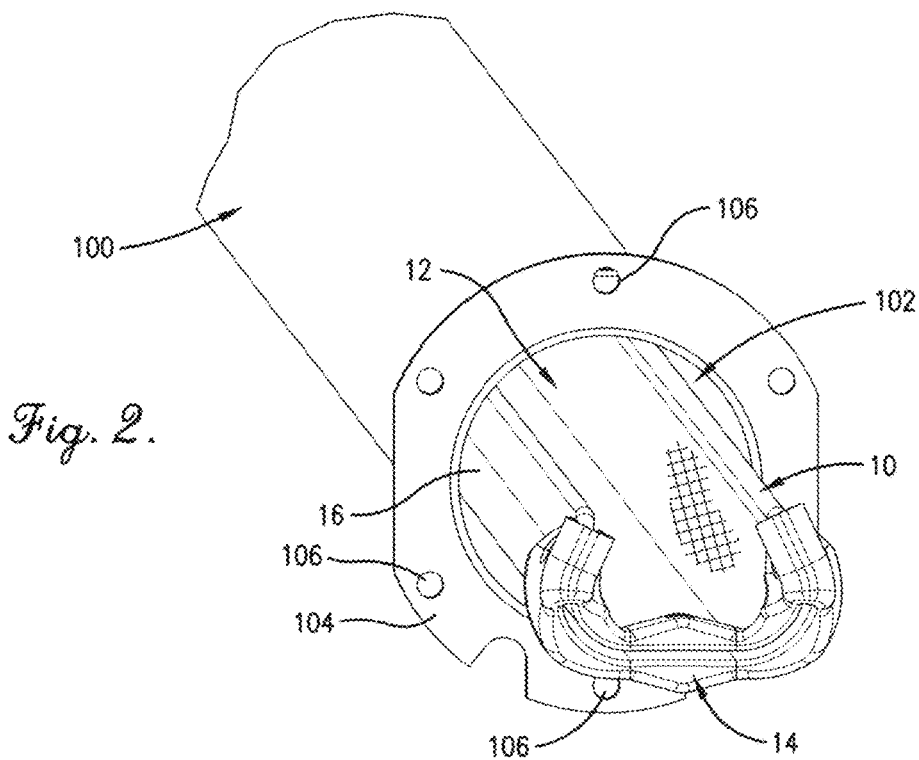
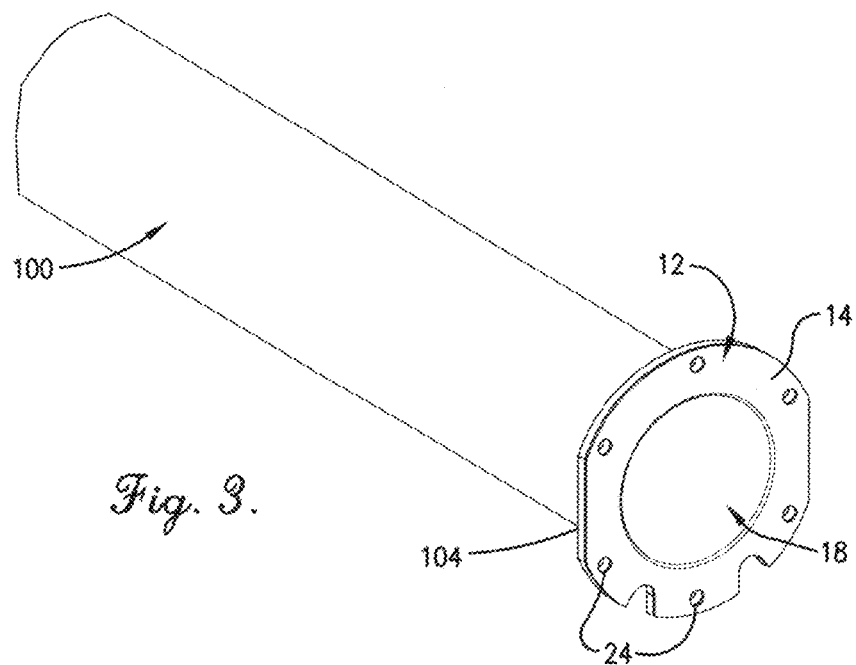

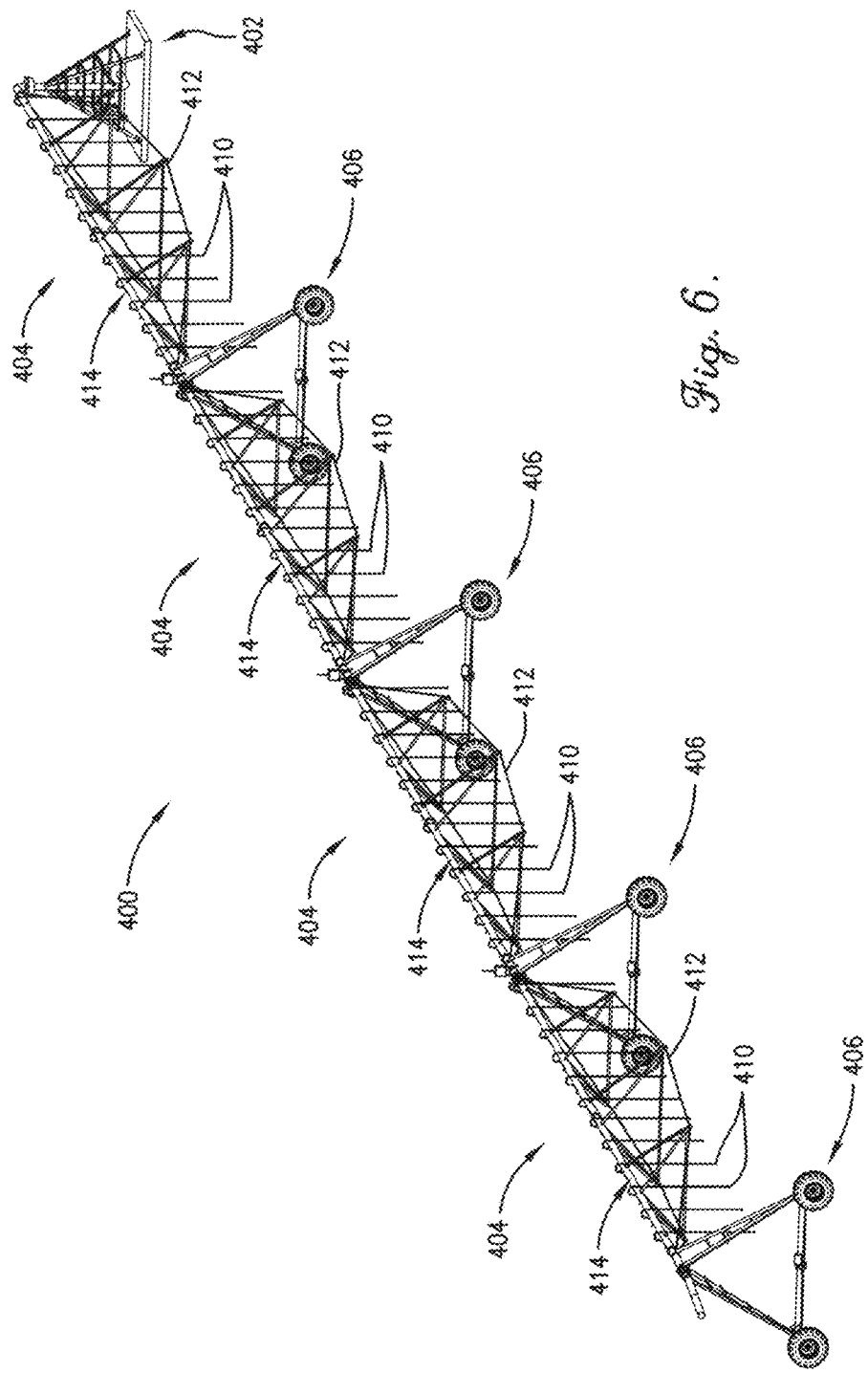

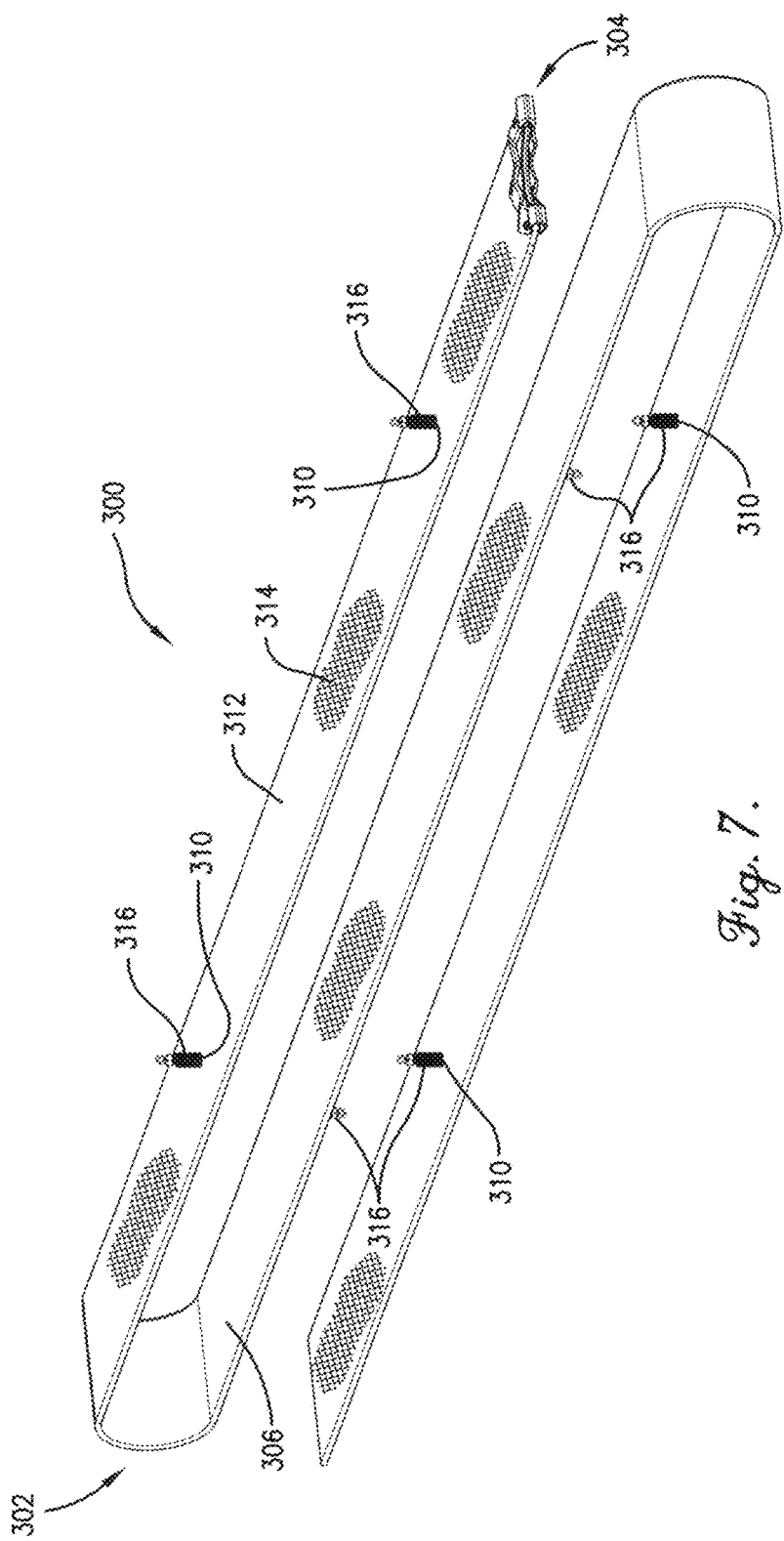

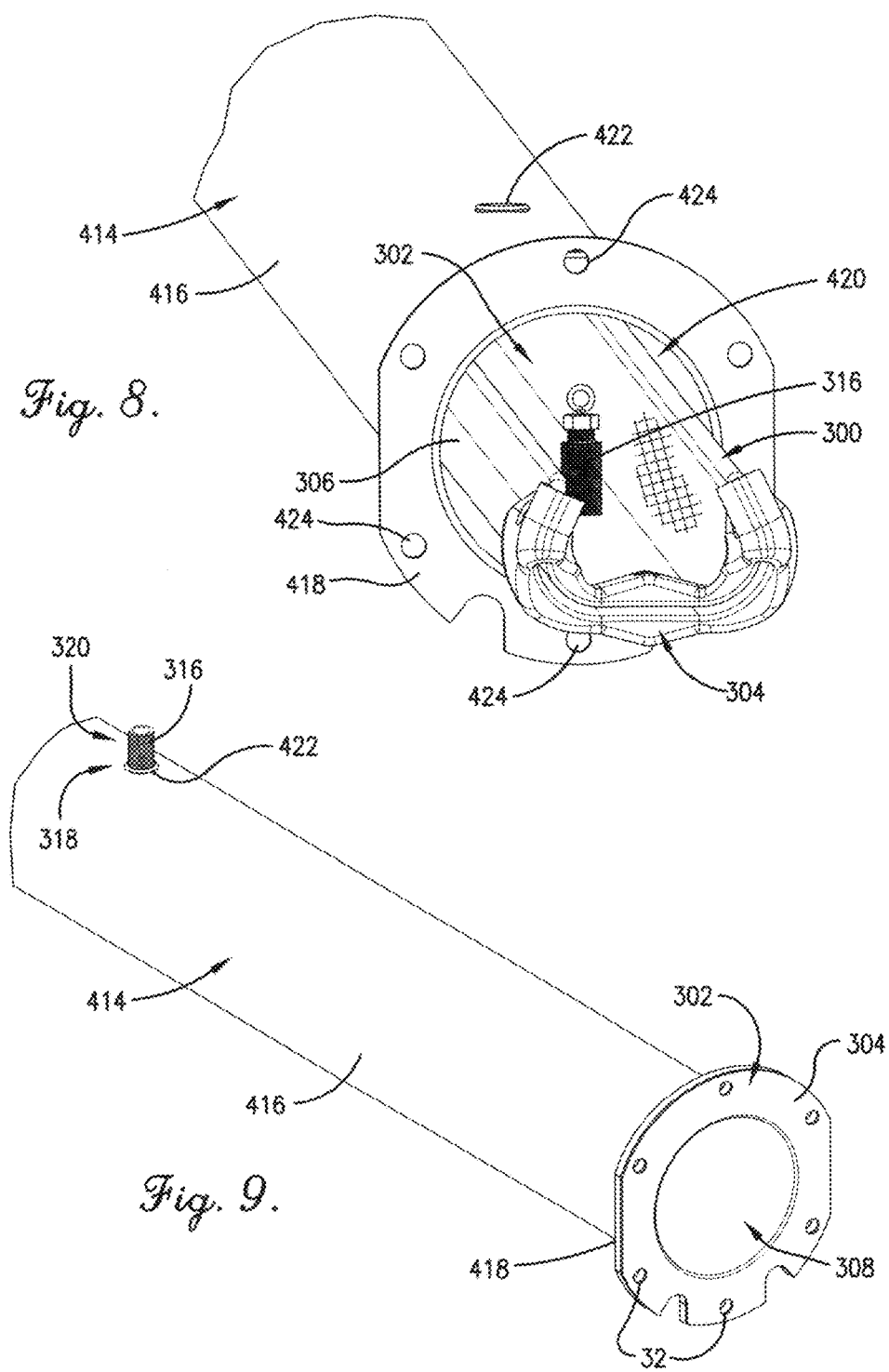

IRRIGATION PIPE LINER

BACKGROUND

The fluid carrying pipes of irrigation systems are often made of galvanized steel or other metals. The source water in some areas is acidic and/or contains chemicals which can cause such metal pipes to corrode and potentially leak. Thus, the pipes of some irrigation systems are fitted with pipe liners made of PVC or other plastic material for preventing such corrosion. However, conventional pipe liners often develop leaks near pipe connections and irrigation span joints and are often difficult to transport and install. Conventional pipe liners also undergo thermal expansion and contraction at significantly different rates than the pipes themselves, which induces stresses in pipe connections and hastens the development of leaks and other damage.

SUMMARY

Embodiments of the invention solve the above-mentioned problems and provide a distinct advance in pipe liners for irrigation system pipes and other pipes. More particularly, the invention provides a pipe liner that is less prone to leak and that is easier to transport and install. The pipe liner also undergoes less thermal expansion than conventional liners and induces little, if any, thermal expansion stress on the pipe connections.

An embodiment of the pipe liner broadly comprises an elongated flexible conduit and a flexible flange on one end of the conduit. The conduit includes an outer wall forming an open-ended central channel for allowing irrigation fluids to be pumped therethrough. The flange extends radially from one end of the conduit and includes a number of fastener holes. The pipe liner is configured to be collapsed and pulled through a pipe. The flange can then be expanded and connected to a rigid flange of the pipe via the fastener holes to secure the pipe liner to the pipe. The pipe liner may be formed of a waterproof material reinforced with a through-tile-weave material. The flange and the conduit may be formed from a single piece of material, which reduces the chances of leaks forming near the flange.

Another embodiment of the pipe liner is specially configured for lining a pipe of an irrigation system such as a central pivot irrigation system, linear move irrigation system, or any other large-scale fluid delivery system. The pipe liner broadly comprises an elongated flexible conduit and a flexible flange substantially similar to the components described above. The pipe liner further includes a number of spaced apart connectors coupled with outlet openings in the conduit. After the pipe liner is pulled through the pipe, the connectors are pulled through holes in the pipe wall and then used for attaching sprinklers to the pipe.

Another embodiment is a method of lining a pipe of an irrigation system. The method includes collapsing a flexible conduit and a flexible flange of a pipe liner and urging the conduit and the flange through the pipe. The flange may then be expanded to a non-collapsed configuration and aligned with a rigid flange of the pipe. A number of outlet openings spaced along the conduit may also be aligned with through-holes of the pipe. Connectors positioned in the outlet openings may then be urged through the through-holes for connecting sprinklers to the connectors. The flange may then be connected to the rigid flange of the pipe and a rigid flange of an adjacent pipe such that leaks do not form near the flange connection.

Other embodiments are similar to the above-described pipe liner except that the pipe liner in these embodiments does not have flexible flanges and is instead configured to be connected directly to hose barbs positioned near the center pivot or other fluid source, between the irrigation spans at the irrigation span joints, or near irrigation end extensions. The pipe liner is configured to line an entire irrigation span or an entire irrigation system, which reduces the overall number of connections and thus further reduces the chances of leaks developing and other damage.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 1 is a perspective view of a pipe liner constructed in accordance with an embodiment of the invention;

FIG. 2 is a partial enlarged perspective view of the pipe liner in a collapsed configuration for being pulled through a pipe;

FIG. 3 is a partial enlarged perspective view of a flexible flange of the pipe liner expanded and aligned with the rigid flange of the pipe of FIG. 2;

FIG. 6 is a perspective view of an exemplary irrigation system for use with certain embodiments of the invention;

FIG. 7 is a perspective view of a pipe liner constructed in accordance with another embodiment of the invention;

FIG. 8 is a partial enlarged perspective view of the pipe liner in a collapsed configuration for being pulled through a pipe of the irrigation system of FIG. 6;

FIG. 9 is a partial enlarged perspective view of a flexible flange of the pipe liner expanded and aligned with the rigid flange of the pipe of FIG. 8;

Figure 4:
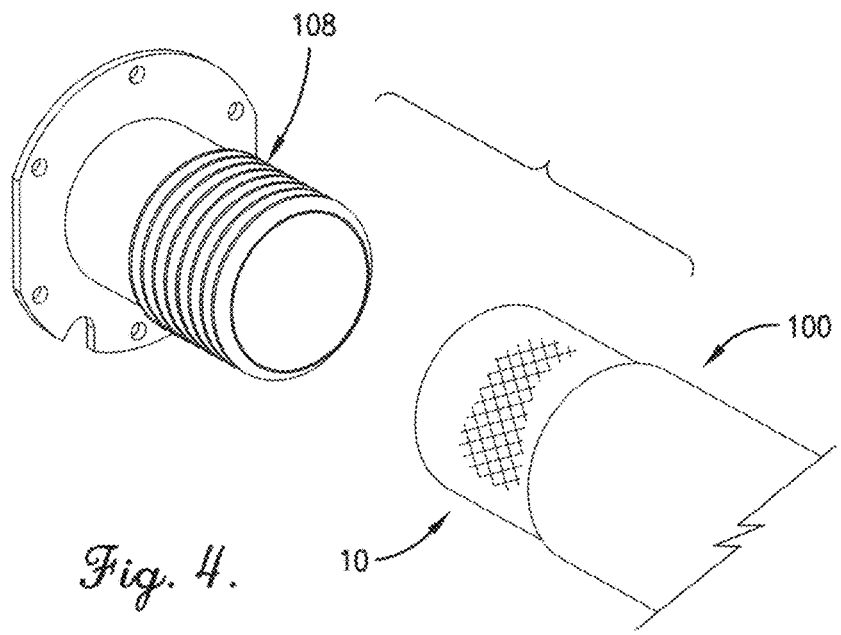
FIG. 4 is an elevation view of a non-flanged end of the pipe liner being connected to a hose barb.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to FIGS. 1-4, a pipe liner 10 constructed in accordance with an embodiment of the invention is illustrated. The pipe liner 10 is configured for lining a fluid-carrying pipe 100 and broadly comprises an elongated flexible conduit 12 and one or two flexible flanges 14.

The flexible conduit 12 protects the pipe 100 from corrosive effects of water or other fluids delivered through a channel 102 of the pipe 100 and broadly comprises an outer wall 16 forming an open-ended central channel 18. The outer wall 16 may be foldable, collapsible, compressible, or otherwise conformable for reversibly reducing an effective diameter or cross sectional area of the flexible conduit 12. This allows the flexible conduit 12 to be pulled through the channel 102, as described in more detail below. To that end, the outer wall 16 may include a tubular watertight layer 20 formed of rubber or other similar material and a reinforcement layer 22 formed of through-tile-weave material or other similar material. The flexible conduit 12 may be formed of extruded flexible hose material trimmed to a predetermined pipe length.

Each flexible flange 14 extends radially from an end of the outer wall 16 for ensuring a watertight seal between the pipe 100 and an adjoining pipe and may include fastener holes 24 for aligning the flexible flange 14 with the rigid flange 104 of the pipe 100. The flexible flange 14 may also have a circular, semi-circular, oblong, or irregular shape to match the shape of the rigid flange 104. Importantly, the flexible flange 14 is foldable, collapsible, compressible, or otherwise conformable for allowing the flexible flange 14 to be pulled through the channel 102 of the pipe 100 along with the flexible conduit 12, as described in more detail below. The flexible flange 14 may be integral with the outer wall 16 of the flexible conduit 12 to prevent fluid from leaking therebetween. To that end, the flexible flange 14 may be formed from the outer wall 16 over a mandrel or similar process. Alternatively, the flexible flange 14 may be stitched or glued to an end of the flexible conduit 12.

Figure 5:
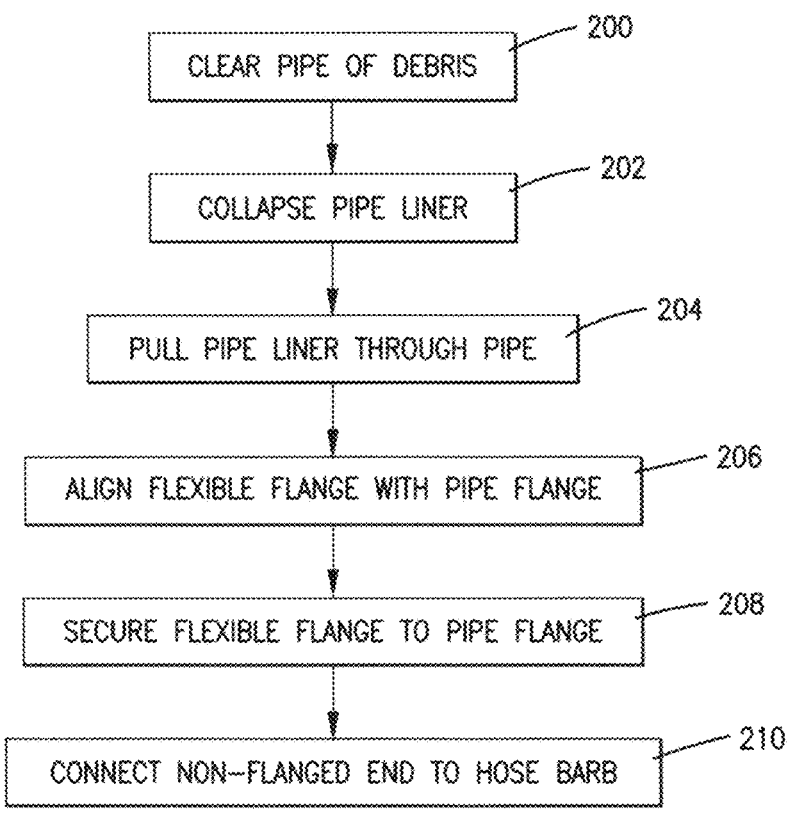
FIG. 5 is a flow diagram for installing the pipe liner in a pipe.
Figure 10:
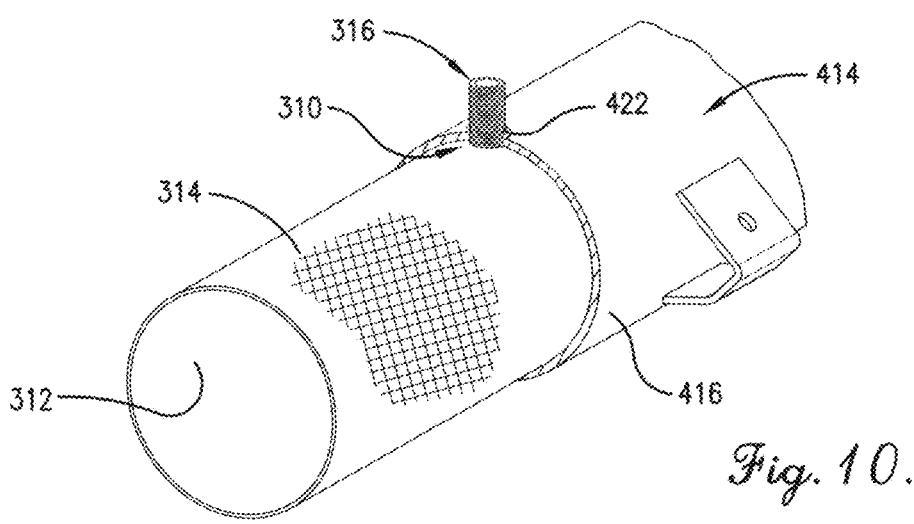
FIG. 10 is a partial enlarged perspective view of an outlet opening and sprinkler connector of the pipe liner.
Figure 11:
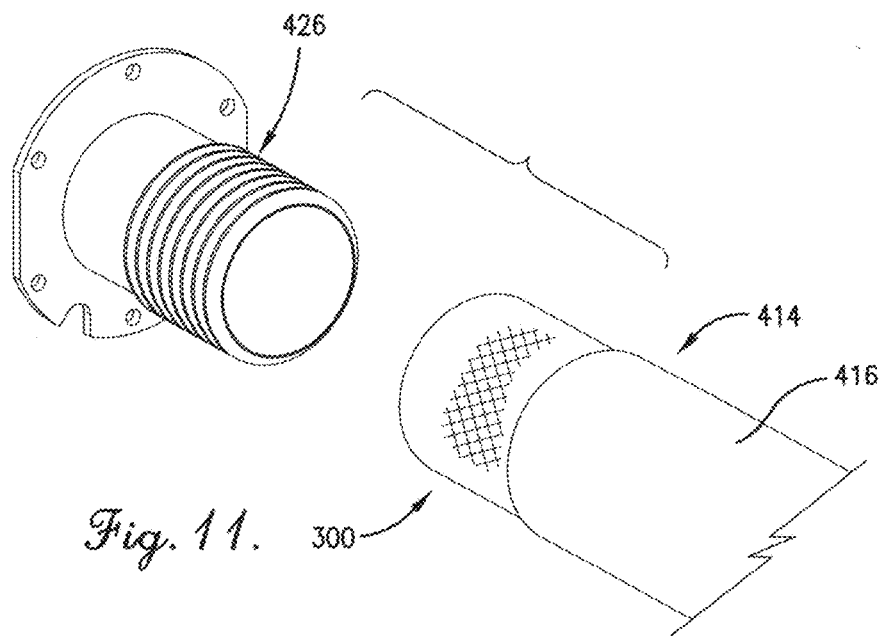
FIG. 11 is an elevation view of a non-flanged end of the pipe liner being connected to a hose barb.

Installing the pipe liner 10 in the pipe 100 will now be described in more detail. First, the channel 102 of the pipe 100 should be free of any loose material, galvanized buildup, or other debris that could wear on the pipe liner 10, as shown in block 200 of FIG. 5. This is because the pipe liner 10 will likely move slightly within the pipe 100 during operation.

The pipe liner 10 may then be folded, flattened, and/or collapsed so that the flexible conduit 12 and the leading flexible flange 14 can be pulled through channel 102 of the pipe 100, as shown in block 202. That is, the outer wall 16 and the leading flexible flange 14 are reduced in effective size to fit within the channel 102.

The pipe liner 10 may then be pulled through the channel 102 of the pipe 100, as shown in block 204. Specifically, the pipe liner 10 is pulled through until the leading flexible flange 14 is positioned near the end of the channel 102.

The flexible flange 14 may then be unfolded or expanded to a non-collapsed configuration such that the fastener holes 24 of the flexible flange 14 and fastener holes 124 of the rigid flange 104 are aligned, as shown in block 206. The flexible flange 14 may need to be rotated until the flexible flange 14 and the rigid flange 104 are aligned.

The flexible flange 14 may then be secured to the rigid flange 104 with the pipe liner 10 being untwisted and/or unfolded within the channel 102 of the pipe 100, as shown in block 208. That is, a rigid flange of an adjacent pipe may sandwich the flexible flange 14 against the rigid flange 104.

A non-flanged end of the pipe liner 10 may also be connected to a hose barb 108, as shown in block 210. To that end, the non-flanged end of the pipe liner 10 may be fitted over the male hose barb 108 and snugly clamped thereon. The hose barb 108 will prevent the pipe liner 10 from becoming disconnected. In some embodiments, the pipe liner 10 could also be connected to a hose barb 108 before the pipe liner 10 is inserted into the pipe 100.

The above-described pipe liner 10 provides many advantages over conventional systems. For example, the pipe liner 10 is collapsible and can be rolled and/or folded. This allows the pipe liner 10 to be inserted through the channel 102 of the pipe 100 and simplifies transportation of the pipe liner 10 to the installation site. The flexible flange 14 also allows the pipe liner 10 to be positively connected to an end of the pipe 100 while maintaining a watertight seal. To that end, the flexible flange 14 and the flexible conduit 12 may be formed of a single piece of material, which reduces the chances of leaks forming near the flexible flange 14. The reinforcement layer 22 also strengthens the pipe liner 10 and prevents the watertight layer 20 of the pipe liner 10 from developing leaks while still allowing the pipe liner 10 to flex. The pipe liner 10 also undergoes less thermal expansion than conventional liners and induces little, if any, thermal expansion stress on the pipe connections.

FIGS. 6-11 illustrate a pipe liner 300 constructed in accordance with another embodiment of the invention. The pipe liner 300 is especially configured for use with central pivot irrigation systems, linear move irrigation systems, stationary irrigation systems, or any fluid distribution system in which water, fertilizers, pesticides, herbicides, or other fluids (hereinafter "fluids") passing through the fluid distribution system may corrode or otherwise degrade pipes of the fluid distribution system. For example, the pipe liner 300 may be used for lining a pipe of an irrigation system 400 (described below).

Embodiments of the irrigation system 400 will first be described in detail with reference to FIG. 6. The illustrated irrigation system 400 is a center pivot system but the principles of the present invention are also applicable to linear and lateral move irrigation systems, stationary irrigation systems, and any other types of irrigation and fluid delivery systems. The irrigation system 400 broadly comprises a central pivot 402 and a plurality of pivot sections 404. The irrigation system 400 may also include a cantilever extension and/or an end gun.

The central pivot 402 distributes water or other fluids to the pivot sections 404 and may be a tower, a standpipe, or the like. The central pivot 402 may include a support structure for withstanding radial loads, axial loads, and twisting loads, a non-rotatable vertically extending pipe, and a rotatable elbow. The non-rotatable vertically extending pipe carries the fluids to an elevated height. The rotatable elbow connects the pivot sections 404 to the non-rotatable vertically extending pipe such that the pivot sections 404 are free to pivot about the central pivot 402 while remaining connected thereto.

The pivot sections 404 broadly comprise a support tower 406, a horizontally extending span 408, and a number of sprinklers 410. The support towers 406 may include an "A-frame" or similar structure for supporting an end of the span 408, a number of wheels connected to the A-frame for traversing across a field, and a motor for powering the wheels. The span 408 connects adjacent support towers together and includes a truss structure 412 and one or more pipes 414. The truss structure 412 provides strength and rigidity to each pipe 414 and may include frame members, cross beams, braces, and other structural members. Each pipe 414 carries fluids radially from the central pivot 402 to the sprinklers 410 and the extension and broadly comprises an outer wall 416 and one or more rigid end flanges 418. The outer wall 416 may be an elongated cylindrical or otherwise tubular structure forming a channel 420 and a number of sprinkler through-holes 422 spaced from ends of the outer wall 416. The outer wall 416 may be formed of galvanized or un-galvanized steel, aluminum, or any other suitable material. The flanges 418 extend radially from ends of the outer wall 416 and include fastener holes 424 for connecting to flanges of adjacent pipes. The flanges 418 may also be formed of galvanized or un-galvanized steel, aluminum, or any other suitable material.

The cantilever extension or end gun extends from a radially outward-most pivot section and increases the distribution area of the irrigation system 400. The extension may be retractable or pivotable in relation to the outward-most pivot section. The extension may be tapered and/or or upward arching for withstanding cantilever forces.

The pipe liner 300 will now be described in detail with reference to FIG. 7-11. The pipe liner 300 broadly comprises a flexible conduit 302, a flexible flange 304, and a plurality of connectors 306.

The flexible conduit 302 protects the pipe 414 of the irrigation system 400 from corrosive effects of water or other fluids delivered via the irrigation system 400 and broadly comprises an outer wall 308 forming an open-ended central channel 310 and a number of outlet openings 312. The outlet openings 312 receive one of the connectors 306 and may be reinforced with a gasket, seal, or additional layers of material for strengthening the area around the outlet openings 312 and preventing leaks from developing near the outlet openings 312. To that end, the outlet openings 312 may be punched or cut holes and may be heat seared to seal the reinforcement.

The outer wall 308 may be foldable, collapsible, compressible, or otherwise conformable for reversibly reducing an effective diameter or cross sectional area of the flexible conduit 302. This allows the flexible conduit 302 to be pulled through the channel 420 of the pipe 414, as described in more detail below. To that end, the outer wall 308 may include a tubular watertight layer 314 formed of rubber or other similar material and a reinforcement layer 316 formed of through-tile-weave material or other similar material. The flexible conduit 302 may be formed of extruded flexible hose material trimmed to a predetermined pipe length.

Each flexible flange 304 extends radially from an end of the outer wall 308 for ensuring a watertight seal between adjoining pipes 414 and may include fastener holes 242 for aligning the flexible flange 304 with the flanges 418 of the pipes 414. The flexible flange 304 may also have a circular, semi-circular, oblong, or irregular shape to match the shape of the flanges 418. Importantly, the flexible flange 304 is foldable, collapsible, compressible, or otherwise conformable for allowing the flexible flange 304 to be pulled through the channel 420 of the pipe 414 along with the flexible conduit 302, as described in more detail below. The flexible flange 304 may be integral with the outer wall 308 of the flexible conduit 302 to prevent fluid from leaking therebetween. To that end, the flexible flange 304 may be formed from the outer wall 308 over a mandrel or similar process. Alternatively, the flexible flange 304 may be stitched or glued to an end of the flexible conduit 302.

The connectors 306 allow the sprinklers 410 to be connected to the pipe liner 300 and the pipe. Each connector 306 may have a first end 318 extending through one of the outlet openings 312 and a second end 320 for engaging a sprinkler 410. The first end 318 and/or the second end 320 may be threaded for ensuring a watertight connection with the outer wall 308 and the sprinkler 410. The connectors 306 may be elongated for extending through one of the through-holes 422 of the outer wall 416 of the pipe 414.

Figure 12:
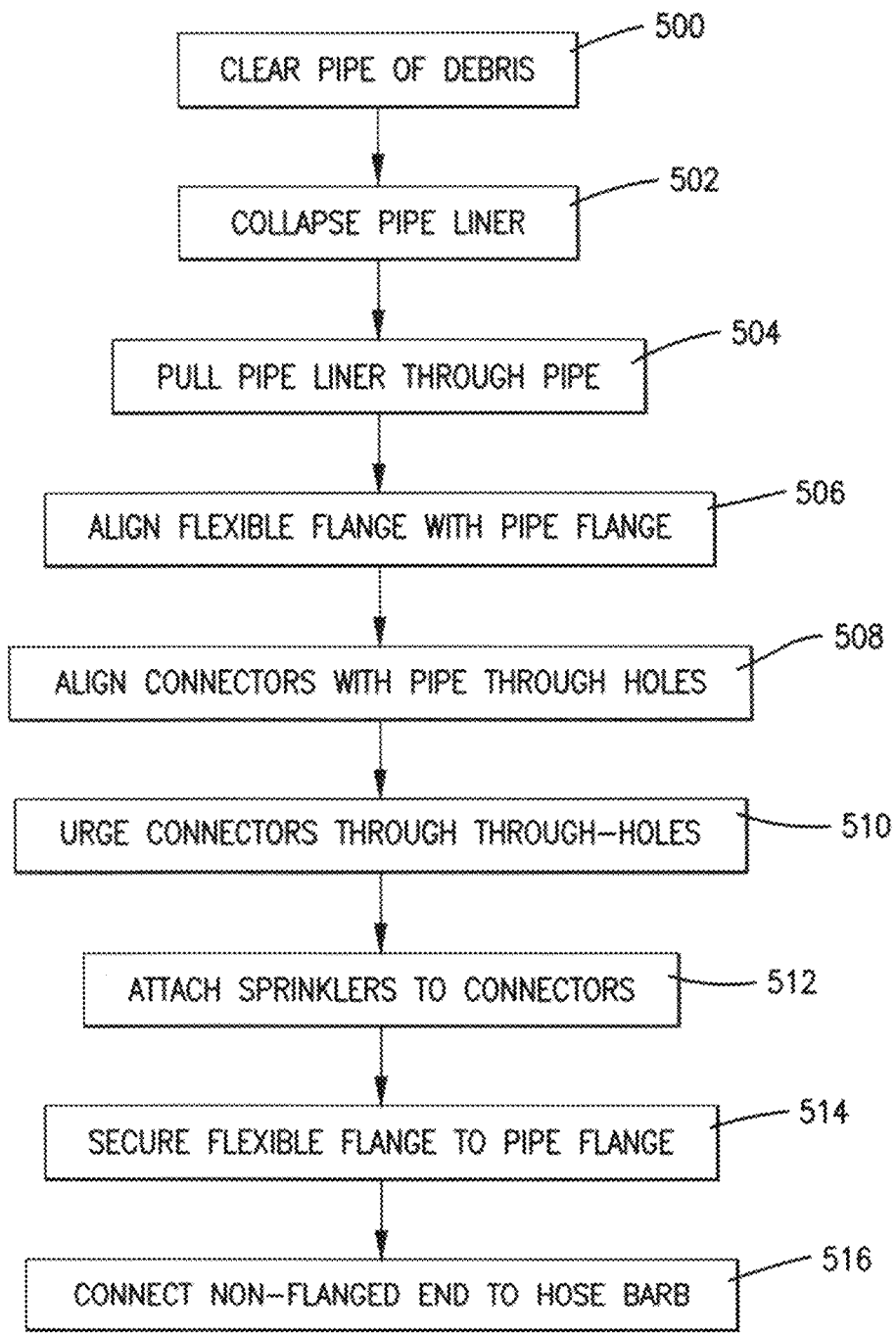
FIG. 12 is a flow diagram for installing the pipe liner in an irrigation pipe.

Installing the pipe liner 300 in the pipe 414 will now be described in more detail. First, the channel 420 of the pipe 414 should be free of any loose material, galvanized build-up, or other debris that could wear on the pipe liner 300, as shown in block 500 of FIG. 12. This is because the pipe liner 300 will likely move slightly within the pipe 414 during operation.

The pipe liner 300 may then be folded, flattened and/or collapsed so that the flexible conduit 302 and the leading flexible flange 304 can be pulled through the pipe 414, as shown in block 502. That is, the outer wall 308 and the leading flexible flange 304 are reduced in effective size to fit within the channel 420 of the pipe 414.

The pipe liner 300 may then be pulled through the channel 420 of the pipe 414, as shown in block 504. Specifically, the pipe liner 300 is pulled through until the leading flexible flange 304 is positioned near the end of the central channel 420 and the connectors 306 are positioned near the through-holes 422 of the outer wall 416 of the pipe 414.

The flexible flange 304 may then be unfolded or expanded to a non-collapsed configuration such that the fastener holes 242 of the flexible flange 304 and the fastener holes 424 of the rigid flange 418 are aligned, as shown in block 506. The flexible flange 304 may need to be rotated until the flexible flange 304 and the rigid flange 418 are aligned.

The connectors 306 may also be aligned with or brought into the vicinity of the through-holes 422 of the pipe 414, as shown in block 508. The pipe liner 300 may need to be rotated about its longitudinal axis until the connectors 306 face the same direction as the through-holes 422.

The connectors 306 may then be pulled outward through the through-holes 422, as shown in block 510. The connectors 306 may be pulled through the through-holes 422 via hooks configured to engage temporary loops attached to the connectors 306 or via other similar tools.

The sprinklers 410 may then be attached to the connectors 306, as shown in block 512. For example, female threaded sprinklers may be screwed onto male threads of the connectors 306.

The flexible flange 304 may then be secured to the rigid flange 418 with the pipe liner 300 being untwisted and/or unfolded within the channel 420 of the pipe 414 and with the connectors 306 being installed in the through-holes 422, as shown in block 514. That is, an adjacent horizontal span or other component of the irrigation system 400 may sandwich the flexible flange 304 against the rigid flange 418.

A non-flanged end of the pipe liner 300 may also be connected to a hose barb 426 such as near the central pivot 402 of the irrigation system 400, as shown in block 516. To that end, the non-flanged end of the pipe liner 300 may be fitted over the male hose barb 426 and snugly clamped thereon. The hose barb 426 will prevent the pipe liner 300 from becoming disconnected. In some embodiments, the pipe liner 300 could be connected to the hose barb 426 before the pipe liner 300 is inserted into the pipe 414.

The above-described pipe liner 300 provides many advantages over conventional systems. For example, the pipe liner 300 is collapsible and can be rolled and/or folded. This allows the pipe liner 300 to be inserted through the channel 420 of the pipe 414 and simplifies transportation of the pipe liner 300 to the irrigation system 400. The flexible flange 304 also allows the pipe liner 300 to be positively connected to an end of the pipe 414 while maintaining a watertight seal. To that end, the flexible flange 304 may be integrated with the flexible conduit 302. The reinforcement layer 316 also strengthens the pipe liner 300 and prevents the watertight layer 314 of the pipe liner 300 from developing leaks while still allowing the pipe liner 300 to flex. The pipe liner 300 also undergoes less thermal expansion than conventional liners and induces little, if any, thermal expansion stress on the pipe connections. The outlet openings 312 may be reinforced with a gasket, seal, or other layers for strengthening the area around the outlet openings 312 and preventing leaks from developing near the outlet openings 312. The connectors 306 can be aligned with the through-holes 422 of the pipe 414 and pulled through the through-holes 422, which simplifies installation. Quick drains can also be added to the irrigation system 400 near joints thereof, with additional pipe sections added near the quick drains for providing support thereto.

Another embodiment is directed to a pipe liner having a flexible conduit similar to the flexible conduits described above except that each end of the flexible conduit terminates without a flange. The ends of the pipe liner are configured to be connected to hose barbs positioned near a central pivot or other water source, between irrigation spans at irrigation span joints, near an end extension or end gun, or near any other flangeless pipe interface. The pipe liner may be configured to line an entire irrigation span (i.e., between adjacent irrigation towers) or an entire irrigation system. This reduces the overall number of pipe liner interfaces and further reduces the chances of the development of leaks and/or joint damage.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A pipe liner for lining a fluid-carrying pipe, the pipe liner comprising:
   an elongated flexible conduit having an outer wall forming an open-ended central channel, the outer wall having a first end and a second end opposite the first end; and
   a flexible flange extending radially from one of the first end and the second end of the outer wall, the flexible flange being stitched to the outer wall of the flexible conduit and including a number of fastener holes for anchoring the pipe liner to a rigid flange of the pipe, the pipe liner being configured to be pulled though the pipe in a collapsed configuration and expanded to a non-collapsed configuration when the flexible conduit is aligned with the pipe and the flexible flange is positioned near a rigid flange of the pipe.

2. The pipe liner of claim 1, wherein the outer wall is reinforced with through-tile-weave material.

3. The pipe liner of claim 1, wherein one of the first end and the second end is configured to be attached to a hose barb for connecting the pipe liner to a fluid source.

4. The pipe liner of claim 1, wherein the flexible flange is integrally formed with the outer wall.

5. The pipe liner of claim 1, wherein the flexible flange is formed of a different material than the outer wall.

6. The pipe liner of claim 1, wherein the flexible flange has a shape that coincides with a shape of the pipe flange when the flexible flange is in the non-collapsed configuration.

7. A pipe liner for lining a pipe of an irrigation system, the pipe liner comprising:
   an elongated flexible conduit having an outer wall forming an open-ended central channel, the outer wall having a first end, a second end opposite the first end, and a number of outlet openings spaced along a length of the conduit;
   a flexible flange extending radially from one of the first end and the second end of the outer wall, the flexible flange including a number of fastener holes for anchoring the liner to a rigid flange of the pipe, the pipe liner being configured to be pulled though the pipe in a collapsed configuration and expanded to a non-collapsed configuration when the flexible conduit is aligned with the pipe and the flexible flange is positioned near a rigid flange of the pipe; and
   a plurality of connectors each having a first end inserted into one of the outlet openings and a second end extending radially outward from the outer wall, the second end of the connector being configured to extend through an opening in the pipe so as to be connectable to a sprinkler.

8. The pipe liner of claim 7, wherein the second end of each connector is threaded.

9. The pipe liner of claim 7, wherein the outer wall of the flexible conduit further comprises a reinforcement layer extending around the outlet opening for reducing localized stress in the outer wall near the outlet opening.

10. The pipe liner of claim 9, wherein the reinforcement layer is heat seared to the outer wall.

11. The pipe liner of claim 7, wherein one of the first end and the second end of the outer wall is configured to be frictionally attached to a hose barb for connecting the pipe liner to a fluid source, the flexible flange being integrally formed with the flexible conduit.

12. The pipe liner of claim 7, wherein the flexible flange has a shape that coincides with a shape of the rigid pipe flange.

13. The pipe liner of claim 7, wherein the outer wall and the flexible flange are at least partially formed of through-tile-weave material.

14. The pipe liner of claim 7, wherein the flexible conduit and flexible flange are configured to be flattened.

15. The pipe liner of claim 14, wherein the outer wall further comprises a reinforcement layer extending around the outlet opening, the reinforcement layer being heat seared to the outer wall for reducing localized stress in the outer wall near the outlet opening, one of the first end and the second end of the outer wall being configured to be frictionally attached to a hose barb for connecting the pipe liner to a fluid source, the flexible flange being integrally formed with the flexible conduit and having a shape that coincides with a shape of the rigid pipe flange.

16. A method of lining a pipe of an irrigation system, the method comprising the steps of:

- collapsing an elongated flexible conduit and a flexible flange of a pipe liner such that the flexible flange fits through the pipe, the flexible conduit including an outer wall forming an open-ended central channel and having a first end and a second end opposite the first end, the flexible flange extending radially from the first end, the second end being a non-flanged end;
- connecting the non-flanged end to a hose barb;
- unfolding or unrolling the flexible pipe liner from a folded or rolled up configuration;
- urging the flexible flange through the pipe until the flexible flange is positioned externally near an end of the pipe with the flexible conduit extending through the pipe;
- expanding the flexible flange to a non-collapsed configuration;
- aligning fastener holes of the flexible flange with fastener holes of a rigid flange of the pipe;
- aligning a connector of the flexible pipe liner with a through-hole of the pipe, the connector extending radially from an outlet opening of the flexible pipe liner;
- pulling the connector through the through-hole of the pipe; and
- attaching a sprinkler to the connector.

\* \* \* \* \*